US008509489B2

(12) United States Patent
Chen

(10) Patent No.: US 8,509,489 B2
(45) Date of Patent: Aug. 13, 2013

(54) SYSTEM AND METHOD FOR ESTIMATING VELOCITY FROM IMAGE SEQUENCE WITH FIRST ORDER CONTINUITY

(75) Inventor: Wei Chen, Potomac, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 505 days.

(21) Appl. No.: 12/892,715

(22) Filed: Sep. 28, 2010

(65) Prior Publication Data

US 2011/0081050 A1   Apr. 7, 2011

Related U.S. Application Data

(60) Provisional application No. 61/248,508, filed on Oct. 5, 2009.

(51) Int. Cl.
G06K 9/00 (2006.01)
G01D 21/00 (2006.01)

(52) U.S. Cl.
USPC ....................................... 382/107; 73/170.31

(58) Field of Classification Search
None
See application file for complete search history.

(56) References Cited

U.S. PATENT DOCUMENTS 6,539,122 B1    3/2003  Abousleman
6,804,400 B1   10/2004  Sharp
8,340,844 B2*  12/2012  Scoca et al. ................ 701/21
2003/0021472 A1   1/2003  Nichogi et al.
2006/0269140 A1  11/2006  Ramsay et al.
2009/0161753 A1   6/2009  Youn et al.
2011/0007819 A1   1/2011  Chen
2012/0148110 A1*  6/2012  Chen ........................... 382/107

OTHER PUBLICATIONS

Chen et al. "Estimation of Surface Velocity from Infrared Image Using the Global Optimal Solution to an Inverse Model", Geoscience and Remote Sensing Symposium, 2008. IGARSS 2008. IEEE International vol. 1, pp. I-383-I-386 , Jul. 2008, Digital Object Identifier: 10.1109/IGARSS.2008.4778874.*

Chen, W.; Mied, R. P.; and Shen, C. Y.; "Near-Surface Ocean Velocity from Infrared Images: Global Optimal Solution to an Inverse Model", Journal of Geophysical Research—Oceans, vol. 113, C10003, pp. 1-13, (Oct. 2008).

(Continued)

Primary Examiner — Bhavesh Mehta
Assistant Examiner — Tahmina Ansari
(74) Attorney, Agent, or Firm — Amy Ressing; Sally A. Ferrett

(57) ABSTRACT

A computer based method for estimating surface velocity based on a time series of at least two images of a same portion of the ocean surface by solving a heat equation having unknown parameters of heat source s and surface velocity components u and v. The images can be infrared or thermal images from the AVHRR or other images. Assign a pattern of sub-arrays with number of pixels in each sub-array sufficient to overdetermine the heat equation without the need to apply divergence and vorticity constraints. Define the heat equation for each interior pixel using bilinear interpolation at each interior based on solutions at the corner pixels. Use linear regression to solve for the unknown parameters u, v, and s for each corner pixel by minimizing total error of the heat equation in finite difference form at all pixels, and find the parameters at each remaining point with bilinear interpolation.

28 Claims, 11 Drawing Sheets

(56) References Cited

OTHER PUBLICATIONS

Emery, W.J.; Thomas, A.C.; Collins, M.J.; Crawford, W.R.; and Mackas, D.L.; "An Objective Method for Computing Advective Surface Velocities from Sequential Infrared Satellite Images", J. Geophys. Res., vol. 91, pp. 12865-12878, (1986).

Kelly, K.A., (1989), "An Inverse Model for Near-Surface Velocity from Infrared Images", J. Phys. Ocean., vol. 19, pp. 1845-1864, (1989).

Kelly, K.A.; and Strub, P.T., Comparison of Velocity Estimates from Advanced Very High-Resolution Radiometer in the Coastal Transition Zone, J. Geophys. Res., vol. 97, pp. 9653-9668, (1992).

Ostrovskii, A., and Piterbarg, L., Inversion for Heat Anomaly Transport from Sea-Surface Temperature Time-Series in the Northwest Pacific, J. Geophys. Res., vol. 100, pp. 4845-4865, (Mar. 1995).

Ostrovskii A.G., and Piterbarg L.I., "Inversion of Upper Ocean Time Series for Entrainment, Advection, and Diffusivity", J. Phys. Ocean., vol. 30, pp. 201-204, (2000).

Vigan, X.; Provost, C.; Bleck, R.; and Courtier, P.; "Sea surface velocities from sea surface temperature image sequences 1. Method and validation using primitive equation model output", J. Geophys. Res., vol. 105, pp. 19499-19514, (2000).

Vigan. X. et al., "Sea Surface Velocities from Sea Surface Temperature Image Sequences 2. Application to the Brazil-Malvinas Confluence Area", J. Geophys. Res., vol. 105, pp. 19515-19534, (2000).

Zavialov, P.O., et al., "An Inverse Model for Seasonal Circulation over the Southern Brazilian Shelf: Near-Surface Velocity from the Heat Budget," J. Phys. Ocean., vol. 28, pp. 545-562, (1998).

Chubb, S.R.; Mied, R.P.; Shen, C.Y.; Chen, W.; Evans, T.E.; and Kohut, J.; "Ocean Surface Currents from AVHRR Imagery: Comparison with Land-based HF Radar Measurements", IEEE Trans. on Geoscience and Remote Sensing, vol. 46, No. 11, pp. 3647-3660, (Nov. 2008).

Frankignoul, C. "Sea surface temperature anomalies, planetary waves, and air-sea feedback in the middle latitudes", J. Geophys. Res., vol. 23, pp. 357-390, (Nov. 1985).

Kundu, P. K., "Ekman veering observed near the ocean bottom", J. Phys. Ocean., vol. 6, pp. 238-242, (1976).

Kohut, J.T.; Glenn, S.M.; and Chant, R.J.; "Seasonal Current Variability on the New Jersey Inner Shelf", J. Geophys. Res.—Oceans, vol. 109, pp. C07S07-1-C07S07-16, (2004).

Press, W.H.; Teukolsky, S.A.; Vetterling, W.T.; and Flannery, B.P.; "Numerical Recipes in C", Cambridge University Press, 2nd Edition, pp. 123-124, (1992).

Shen, C.Y.; and Evans, T.E.; "Inertial instability and sea spirals", Geophys. Res. Lett., vol. 29, No. 23, pp. 39-1-39-4, doi: 10.1029/2002GL015701, (2002).

Shen, C.Y.; Evans, T.E.; Mied, R.P.; and Chubb, S.R.; "A velocity projection framework for inferring shallow water currents from surface tracer fields", "Cont. Shelf Research", vol. 28, pp. 849-864, 2008. (Available online Jan. 26, 2008).

Wentz, F.J.; Gentemann, C.; Smith, D.; and Chelton, D.; "Satellite measurements of sea surface temperature through clouds", Science, vol. 288, pp. 847-850, (May 2000).

Jing Zhang and Guizhong Liu, "An efficient reordering prediction-based lossless compression algorithm for hyperspectral images", Apr. 2007, IEEE Geoscience and Remote Sensing Letters, vol. 4, No. 2, pp. 283-287.

Jing Zhang and Guizhong Liu, "A novel lossless compression for hyperspectral images by adaptive classified arithmetic coding in wavelet domain", 2006, IEEE International Conference on Image Processing (ICIP), pp. 2269-2272.

* cited by examiner

122

USE LINEAR REGRESSION TO SOLVE FOR u, v, AND s AT EACH KNOT BY MINIMIZING TOTAL ERRORS OF THE FINITE DIFFERENCE HEAT EQUATION AT ALL PIXELS:

$$\text{MINIMIZE } \chi^2 = \sum_{i=1}^{N_1} \sum_{j=1}^{N_2} \left( \frac{\partial T_{ij}}{\partial t} - \sum_{\alpha=1}^{N_T} a_\alpha B_{\alpha\, ij} \right)^2$$

WHERE THE TERMS IN THE FINITE DIFFERENCE EQUATION HAVE BEEN REWRITTEN AS $$B_{\alpha\, ij} = \begin{cases} X_{ijpq} & (1 \leq \alpha \leq N_L) \\ -\dfrac{\partial T_{ij}}{\partial x} X_{ijpq} & (N_L + 1 \leq \alpha \leq 2N_L) \\ -\dfrac{\partial T_{ij}}{\partial y} X_{ijpq} & (2N_L + 1 \leq \alpha \leq 3N_L) \end{cases}$$

AND $$a_\alpha = \begin{cases} s_\alpha & (1 \leq \alpha \leq N_L) \\ u_{\alpha - N_L} & (N_L + 1 \leq \alpha \leq 2N_L) \\ v_{\alpha - 2N_L} & (2N_L + 1 \leq \alpha \leq 3N_L) \end{cases}$$

124

SOLVE FOR u, v, AND s AT EACH OF THE INTERIOR PIXELS OF THE SUBARRAYS USING BILINEAR INTERPOLATION

126

GENERATE VELOCITY FIELD PLOT WITH DATA FROM A SUBSET OF THE PIXELS

FIG. 1B

 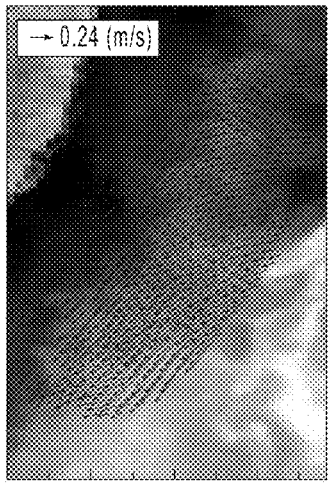 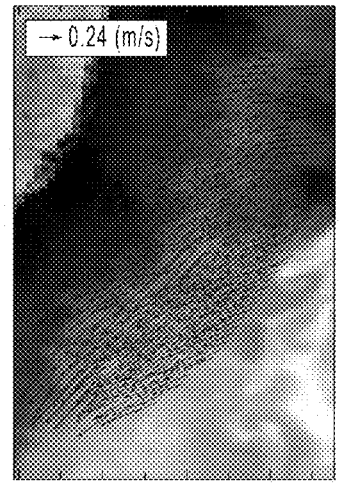
FIG. 11A  FIG. 11B  FIG. 11C
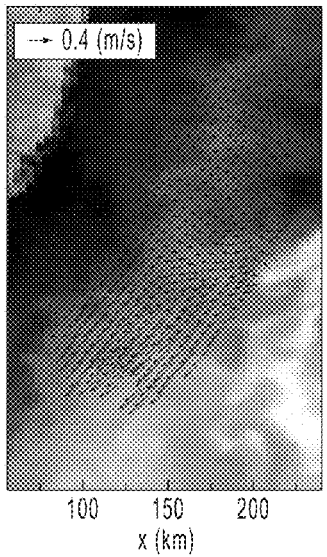 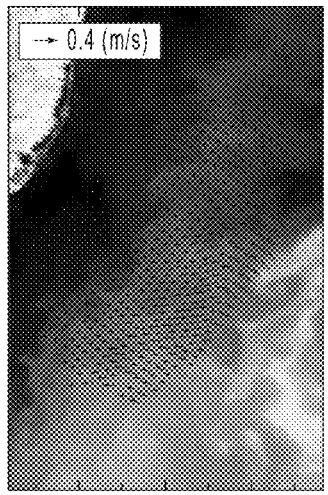 
FIG. 12A  FIG. 12B  FIG. 12C

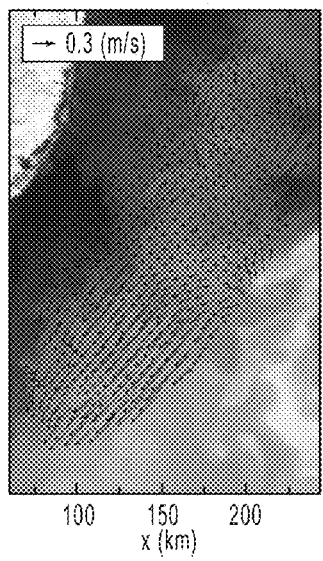
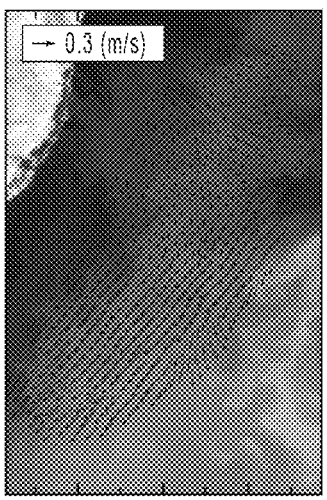
FIG. 13A   FIG. 13B   FIG. 13C
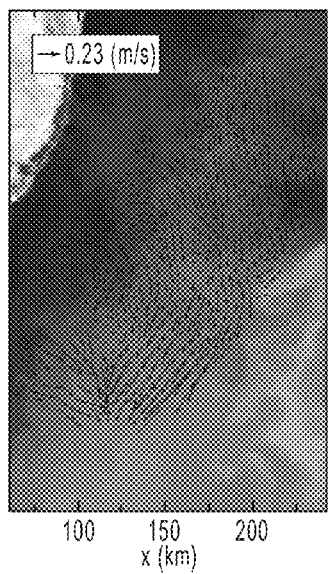
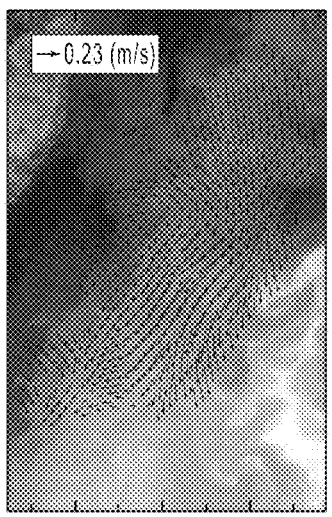
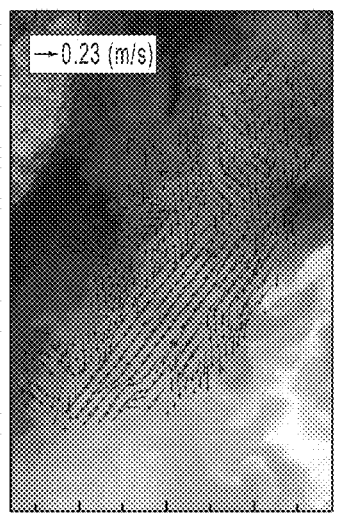
FIG. 14A   FIG. 14B   FIG. 14C

SYSTEM AND METHOD FOR ESTIMATING VELOCITY FROM IMAGE SEQUENCE WITH FIRST ORDER CONTINUITY

CROSS-REFERENCE TO RELATED APPLICATIONS

This application is a non-provisional application under 35 USC 119(e) and claims the benefit of U.S. Provisional Application 61/248,508 filed on Oct. 5, 2009, the entire disclosure of which is incorporated herein by reference.

BACKGROUND OF THE INVENTION

1. Technical Field

This invention relates to remote sensing in general, and particularly to systems for determining the ocean's surface velocity based on changes in sea surface temperature from satellite-based thermal imagers.

2. Background Technology

Imaging of the world's oceans from space provides large-area synoptic views, and sequential images of the same scene allow us to calculate sea surface velocities. These two-dimensional velocity fields can be very useful in understanding the dynamics of the ocean. Researchers have employed a number of schemes to calculate sea surface velocities from Sea Surface Temperature (SST), but perhaps the two that have received the most widespread use are the Maximum Cross Correlation (MCC) technique of Emery et al. "An Objective Method for Computing Advective Surface Velocities from Sequential Infrared Satellite Images", J. Geophys. Res., Vol. 91, pp. 12865-12878, 1986, and the heat equation INVerse model (INV) described in Kelly, K. A., (1989), "An Inverse Model for Near-Surface Velocity from Infrared Images", J. Phys. Ocean., Vol. 19, pp. 1845-1864, 1989 and in Kelly, K. A., and P. T. Strub, "Comparison of Velocity Estimates from Advanced Very High-Resolution Radiometer in the Coastal Transition Zone, J. Geophys. Res., Vol. 97, pp. 9653-9668, (1992).

The INV model has also been used to infer the properties of the ocean surface mixed layer. For example, Ostrovskii and Piterbarg have inverted an advection-diffusion equation for the upper ocean mixed layer in different areas of the Pacific Ocean for velocity, as well as vertical mixed layer entrainment velocity and horizontal diffusivity, as described in A. Ostrovskii and L. Piterbarg, "Inversion for Heat Anomaly Transport from Sea-Surface Temperature Time-Series in the Northwest Pacific, J. Geophys. Res., Vol. 100, pp. 4845-4865, (1995) and in Ostrovskii AG, L. I. Piterbarg, "Inversion of Upper Ocean Time Series for Entrainment, Advection, and Diffusivity", J. Phys. Ocean., Vol. 30, pp. 201-204, (2000).

In Vigan, X., C. Provost, R. Bleck, and P. Courtier, (2000), "Sea surface velocities from sea surface temperature image sequences 1. Method and validation using primitive equation model output", *J. Geophys. Res.*, 105, 19499-19514 and Vigan. X. et al., "Sea Surface Velocities from Sea Surface Temperature Image Sequences 2. Application to the Brazil-Malvinas Confluence Area", *J. Geophys. Res.*, 105, 19515-19534. (2000), model-generated data is used to demonstrate the method in the Brazil-Malvinas confluence region. In Zavialov, P. O. et al., "An Inverse Model for Seasonal Circulation over the Southern Brazilian Shelf: Near-Surface Velocity from the Heat Budget," *J. Phys. Ocean.*, 28, 545-562, 1998, a similar calculation was performed for the same region using sea surface temperature mapped from in-situ measurements.

BRIEF SUMMARY OF THE INVENTION

An aspect of the invention is directed to a computer based method for estimating surface velocity based on a time series of at least two images of a same portion of the ocean surface, with a heat equation having unknown parameters being a heat source term s, an x-component of the surface velocity, and a y-component of the surface velocity. The method includes assigning a pattern of sub-arrays with a number of pixels in each sub-array, the number of pixels in each sub-array being at least as large as the product of the number of unknown parameters in the heat equation times the number of corner pixels in each sub-array. For each sub-array, the unknown parameters for each interior pixel are defined using bilinear interpolation based on the adjacent corner pixels. The method also includes using linear regression to solve for the unknown parameters u, v, and s for each corner pixel by minimizing total error of the heat equation in finite difference form at all pixels.

A computer based method for estimating velocity based on a time series of at least two images of a same portion of the ocean surface, with an optical flow equation having unknown parameters including an x-component of the surface velocity and a y-component of the surface velocity includes assigning a pattern of sub-arrays with a number of pixels in each sub-array, the number of pixels in each sub-array being at least as large as the product of the number of unknown parameters in the heat equation times the number of corner pixels in each sub-array. For each sub-array, the unknown parameters for each interior pixel are defined using bilinear interpolation based on the adjacent corner pixels. The method includes using linear regression to solve for the unknown parameters u and v for each corner pixel by minimizing total error of the heat equation in finite difference form at all pixels.

A computer readable medium including programmed instructions stored thereon, said instructions configured for estimating surface velocity based on a time series of at least two images of a same portion of the ocean surface, with a heat equation having unknown parameters being a heat source term s, an x-component of the surface velocity, and a y-component of the surface velocity. The instructions are for instructions for assigning a pattern of sub-arrays with a number of pixels in each sub-array, the number of pixels in each sub-array being at least as large as the product of the number of unknown parameters in the heat equation times the number of corner pixels in each sub-array. For each sub-array, the unknown parameters for each interior pixel are defined using bilinear interpolation based on the adjacent corner pixels. The instructions also are for using linear regression to solve for the unknown parameters u, v, and s for each corner pixel by minimizing total error of the heat equation in finite difference form at all pixels.

BRIEF DESCRIPTION OF THE DRAWINGS

FIGS. 1A and 1B show a example of a method for obtaining accurate estimates of the ocean surface velocity from a time series of at least two images of the same portion of the ocean surface.

FIGS. 11A-11C illustrate the CODAR velocity field, the estimated velocity field obtained by the Global Optimal Solution method, and the velocity field obtained using the Maximum Cross Correlation method with imagery from the AVHRR.

FIGS. 12A-12C illustrate the CODAR velocity field, the estimated velocity field obtained by the Global Optimal Solution method, and the velocity field obtained using the Maximum Cross Correlation method with imagery from the AVHRR with a different time interval between images.

FIGS. 13A-13C illustrate the CODAR velocity field, the estimated velocity field obtained by the Global Optimal Solution method, and the velocity field obtained using the Maximum Cross Correlation method with imagery from the AVHRR with a different time interval between images.

FIGS. 14A-14C illustrate the CODAR velocity field, the estimated velocity field obtained by the Global Optimal Solution method, and the velocity field obtained using the Maximum Cross Correlation method with imagery from the AVHRR with a different time interval between images.

DETAILED DESCRIPTION OF EMBODIMENTS OF THE INVENTION

Figure 1A:
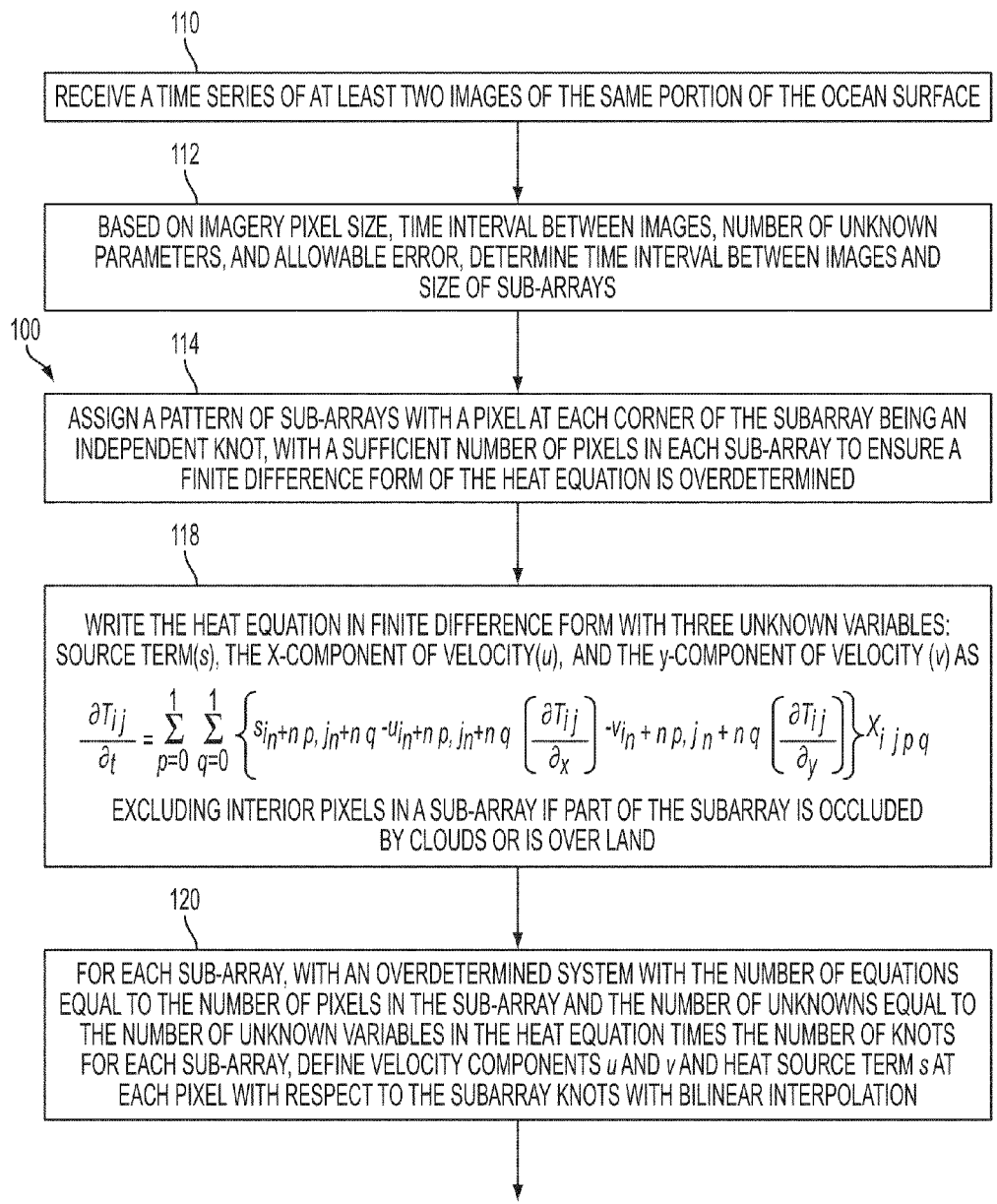

FIGS. 1A and 1B illustrates an example of a method 100 for obtaining accurate estimates of the ocean surface velocity from a time series of at least two images of the same portion of the ocean surface.

The images can be thermal imagery, in an infrared wavelength, or in other types of imagery. One source of thermal imagery is Advanced Very High Resolution Radiometer (AVHRR) image sequences.

The thermal imager carried by a satellite captures sequential images of the same portion of the ocean surface. The satellite can capture an image as it passes over the portion of the ocean surface, and on the next passage over the same portion of the ocean surface, capture a second image. Alternatively, if the satellite is in geostationary orbit, the imagery can be captured at a desired interval between images. The thermal images will have an intensity for each pixel, which represents the sea surface temperature at that pixel. An initial step of the method is receiving 110 the imagery sequence.

Direction and amplitude of the surface velocity is determined based on an image sequence of the sea surface, as described below.

The evolution of the temperature field in a three-dimensional (3D) ocean is governed by the heat equation $$\frac{\partial T}{\partial t} + v \cdot \nabla T = \kappa \nabla^2 T + S, \quad (1)$$

where r=(x, y, z) is a position vector, T=T(r,t) is the temperature field, v=v(r,t)=(u, v, w) is the velocity, and κ is a diffusion coefficient. In the near-surface mixed layer, the variable S=S(r,t) is a source term containing the effects of air-sea interaction and turbulent processes within the mixed-layer. In this region, the flow is generally modeled as depth independent or locally barotropic, so that an integral over the mixed-layer depth h of Eq. (1) yields $$T_t + uT_x + vT_y = s, \quad (2)$$

where now, T and (u, v) are functions of only x and y. The term T may thus be viewed as the Sea Surface Temperature (SST). The term s contains the depth-integrated (and unknown) meteorological forcing and mixed layer entrainment terms (see, e.g., Frankignoul, 1985; Ostrovskii and Piterbarg, 1995), and is given by $$s(x, y, t) = \frac{1}{h}\int_0^h S(x, y, z)dz - \frac{1}{h}\int_0^h w(x, y, z, t)T_z(x, y, z, t)dz. \quad (3)$$

Additional information on the source term s is found in Frankignoul, C., "Sea surface temperature anomalies, planetary waves, and air-sea feedback in the middle latitudes", *J. Geophys. Res., Vol.* 23, pp. 357-390, 1985 and in A. Ostrovskii and L. Piterbarg, "Inversion for Heat Anomaly Transport from Sea-Surface Temperature Time-Series in the Northwest Pacific, J. Geophys. Res., Vol. 100, pp. 4845-4865, (1995).

The influence of horizontal diffusion can be neglected, as it is usually an order of magnitude less than the advective acceleration term.

The temporal and spatial derivatives of the SST fields in equation (2) can be calculated from the temperature fields on the thermal images. The problem is considered under-determined, however, because three unknowns (u, v, and s) must be derived from a single conservation statement (2) at each of these pixel points.

One way to address the mismatch between the number of unknowns and conservation statements has been to represent the velocity field with a two-dimensional truncated Fourier series is shown in Kelly, K. A., (1989), "An Inverse Model for Near-Surface Velocity from Infrared Images", J. Phys. Ocean., Vol. 19, pp. 1845-1864, 1989. Kelly further constrained the solution to the heat equation by generating a cost function with divergence, vorticity, and energy norms. This strategy results in an over-determined system, which can then be solved by a least-squares method. Another approach has been to combine a finite element method and a variational approach to solve the problem, as discussed in Vigan, X., C. Provost, R. Bleck R, and P. Courtier, (2000), "Sea surface velocities from sea surface temperature image sequences 1.

Method and validation using primitive equation model output", J. Geophys. Res., 105, 19499-19514 and Vigan. X. et al., "Sea Surface Velocities from Sea Surface Temperature Image Sequences 2. Application to the Brazil-Malvinas Confluence Area", J. Geophys. Res., Vol. 105, pp. 19515-19534, (2000).

It is noted that the distance the isotherms are advected by currents between two consecutive observations can be several pixels wide, so only current velocities having spatial scales of variation greater than several pixels can be resolved from SST motion. The velocity variation over several pixels may thus be represented by low-order polynomials. A low-order polynomial representation of the velocity variation over several pixels can be used to obtain an over-determined set of heat equation constraints for the unknown velocity and sources without resorting to additional constraints.

Figure 2:
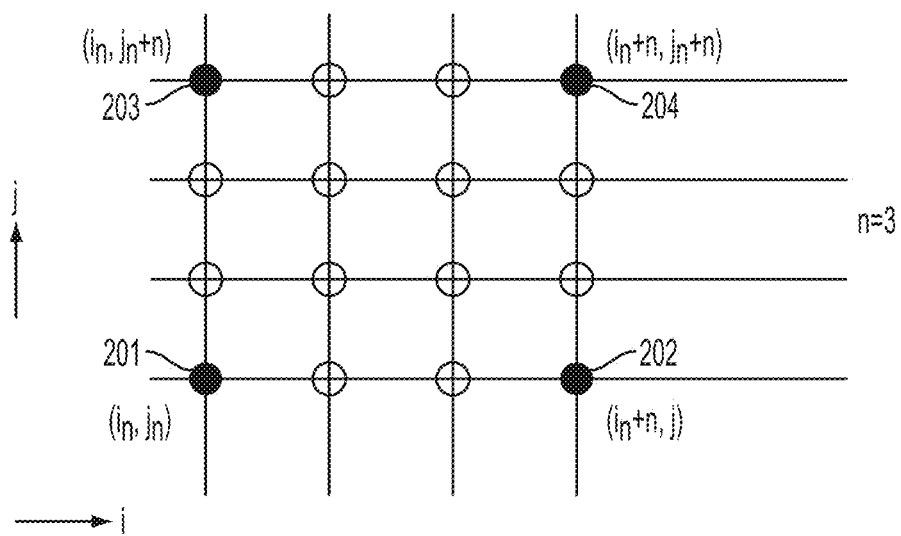
FIG. 2 illustrates a sub-array applied to an image in the method of FIG. 1A and FIG. 1B.

Referring next to FIG. 2, the image scene is initially divided into a number of N×N square pixel sub-arrays. Within each of these sub-arrays, the velocities and sources are defined in terms of the corner points, which are called "knots". The number of knots ($N_L$) for a given degree of the interpolation formula is $N_L = 2^2 = 4$ for a second degree, or bilinear interpolation. For a square array, the number of pixels will be N×N, with N=n+1, where n is the number of interpolation points.

In FIG. 2, $N_L$ is equal to four, and there are four corner points or knots 201, 202, 203, 204. The remaining twelve pixels or points are "interior" pixels, whose values of s, u, and v can be solved by bilinear interpolation based on the corner or knot pixels 201-205, as discussed below. The number of interpolation points between the knots is n.

Any bilinear function $f(x, y)$ may be represented over a sub-array in terms of its corner points $(x_p, y_q)$ by $$f(x, y) = \sum_{p=0}^{1} \sum_{q=0}^{1} f(x_p, y_q) \prod_{\substack{k=0 \\ k \neq p}}^{1} \frac{(x - x_k)}{(x_p - x_k)} \prod_{\substack{l=0 \\ l \neq q}}^{1} \frac{(y - y_l)}{(y_q - y_l)}. \quad (4)$$

Similarly, the terms s, u, and v can be written as $$(s_{ij}, u_{ij}, v_{ij}) = \quad (5)$$

$$\sum_{p=0}^{1} \sum_{q=0}^{1} (s_{i_n+n\,p, j_n+n\,q}, u_{i_n+n\,p, j_n+n\,q}, v_{i_n+n\,p, j_n+n\,q}) X_{i\,j\,p\,q},$$

where $X_{i\,j\,p\,q}$ is a two-dimensional bilinear Lagrange polynomial interpolation formula defined by $$X_{i\,j\,p\,q} = \frac{1}{n^2} \prod_{\substack{k=0 \\ k \neq p}}^{1} (i - i_n - nk) \prod_{\substack{l=0 \\ l \neq q}}^{1} (j - j_n - nl), \quad (6)$$

where i and j are pixel indices over the entire image scene, $$i_n = n\left[\frac{i}{n}\right] \text{ and } j_n = n\left[\frac{j}{n}\right]$$

are knot indices, where [ ] denotes an integer operator, and n−1 is the number of interpolation points between two knots.

The heat equation (2) can be written in finite difference form for all image pixels {i, j} as $$\frac{\partial T_{i\,j}}{\partial t} = \sum_{p=0}^{1} \sum_{q=0}^{1} \left\{ \begin{array}{l} s_{i_n+n\,p, j_n+n\,q} - \\ u_{i_n+n\,p, j_n+n\,q}\left(\frac{\partial T_{i\,j}}{\partial x}\right) - \\ v_{i_n+n\,p, j_n+n\,q}\left(\frac{\partial T_{i\,j}}{\partial y}\right) \end{array} \right\} X_{i\,j\,p\,q}, \quad (7)$$

which can be written in more compact form as $$\frac{\partial T_{i\,j}}{\partial t} = \sum_{\alpha=1}^{3N_L} a_\alpha B_{\alpha\,i\,j}, \quad (8)$$

in which the row and column indices {p, q} have been converted to the sequential vector index α, and $a_\alpha$ and $B_{\alpha ij}$ are defined as $$B_{\alpha\,i\,j} = \begin{cases} X_{i\,j\,p\,q} & (1 \leq \alpha \leq N_L) \\ -\frac{\partial T_{i\,j}}{\partial x} X_{i\,j\,p\,q} & (N_L + 1 \leq \alpha \leq 2N_L) \\ -\frac{\partial T_{i\,j}}{\partial y} X_{i\,j\,p\,q} & (2N_L + 1 \leq \alpha \leq 3N_L) \end{cases} \quad (9)$$

$$a_\alpha = \begin{cases} s_\alpha & (1 \leq \alpha \leq N_L) \\ u_{\alpha - N_L} & (N_L + 1 \leq \alpha \leq 2N_L) \\ v_{\alpha - 2N_L} & (2N_L + 1 \leq \alpha \leq 3N_L) \end{cases} \quad (10)$$

This step is shown at FIG. 1, step 118.

Equations (7) or (8) each have three unknown parameters for each of the independent knots in the sub-array. For example, the three unknown parameters in Equation (7) are the source parameter $S_{i_n j_n}$, and the velocity components $u_{i_n j_n}$ and $v_{i_n j_n}$. With $N_L = 4$ for a two-dimensional image, there will be a total of $3 \times N_L = 12$ unknown parameters for the sub-array. Note that there are $(n+1)^2 = N \times N = 16$ pixels, so the total number of equations for this sub-array is 16 equations, and because the number of equations is greater than the number of unknowns, the system is overdetermined.

As another example, for a sub-array with N=5 (n=4), the number of unknown parameters for the sub-array is 12, and the number of equations is 25. Since the number of equations is greater than the number of unknowns, this system is over-determined.

If the sub-array had N=3 (n=2), the number of equations would be 9. Since the number of equations would be less than the number of unknowns, the system would be under-determined.

The over-determined system of equation (7) or (8) can be solved by a least-squares method on a square pixel sub-array if the number of unknown parameters, $3 \times N_L$, is less than the number of equations, or $(n+1)^2$. Since $N_L = 4$, the condition that we have an over-determined system is satisfied for $n \geq 3$, which has important implications for the minimum resolvable velocity structure using GOS. When n=3, FIG. 2 shows that the minimum complete cell has four pixels. For the AVHRR images discussed below, the pixel size is 1.15 km, so the minimum resolvable velocity structure is approximately equal to 4×1.15 km=4.6 km. In comparison, for SST data from a microwave instrument such as the TRMM microwave imager (TMI) having a 50 km pixel size, the pixel size determines that structures with sizes approximately 200 km can be resolved (e.g., 4×50 km).

Thus, referring again to FIG. 1, at step 112 and 114, the value for n and the resulting size of the sub-arrays is selected to be large enough so that the number of pixels overdetermines the heat equation, and the pattern of sub-arrays is assigned to both of the images in the sequence. At step 120 in FIG. 1, the heat equation (7) or (8) is solved for the velocity components u and v and the source term s by a least-squares method on each of the square pixel sub-arrays, with bilinear interpolation at the interior pixels.

As discussed in further detail in later paragraphs, the optimum accuracy is not achieved unless the scale of the velocity structure is greater than V·Δt, where V is the velocity amplitude and Δt is the time interval between images.

Figure 3:
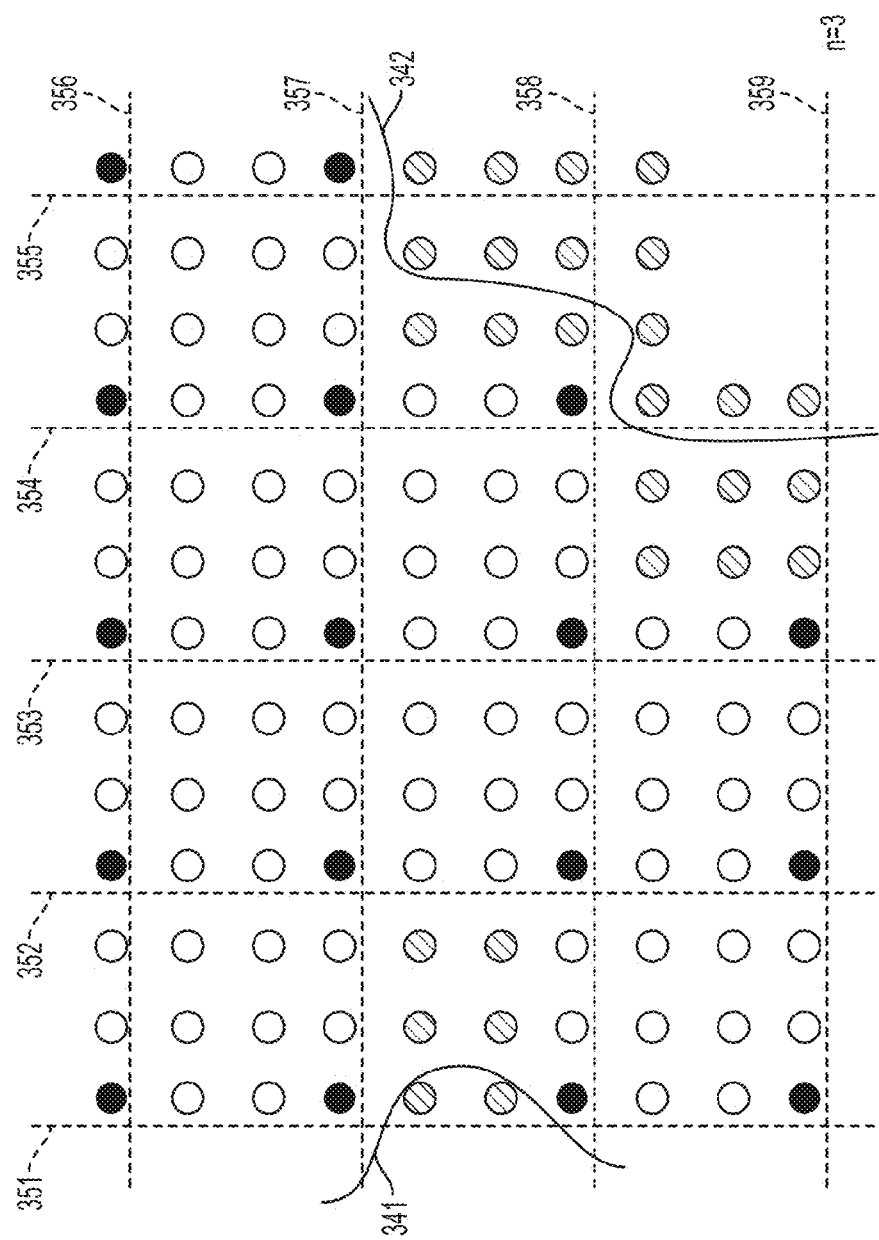
FIG. 3 illustrates a pattern of sub-arrays applied to an image in the method of FIG. 1A and FIG. 1B.

FIG. 3 illustrates an application of the square grids over the entire image area, thus extending the optimal problem to a global domain. As in FIG. 2, the dark pixels are the independent pixels (knots), and the light pixels are the dependent pixels or interior pixels in each sub-array.

Just as in FIG. 2, each pixel sub-array has N×N, or 4×4=16 nodes, with $N_L$=4 knots. Note that the lines 341 and 342 represent a cloud boundary or land boundary, and the areas outside these areas will not have accurate sea surface temperature values. Therefore, the hatched pixels in sub-arrays that include the boundary lines 341 and 342 are not considered in the local inversion because the land or cloud boundary goes through the bilinear square grid (sub-array) of which they are part. This is shown as part of step 118 in FIG. 1.

The pixel sub-arrays can be assembled to form an arbitrary shape, in which a linear equation system with unknown variables $a_\alpha$ at knot points can be solved uniquely if the total number of pixels in the selected area is greater than the total number of $a_\alpha$ times the total number of knots ($N_L$). In this example, the number of unknown variables is 3 (u, and v, and source term s).

The two-dimensional bilinear Lagrange polynomial function of equation (6) is written as in a form compatible with Eq. (8) as:

$$X_{i\,j\,p\,q} = \begin{cases} \frac{1}{n^2} \prod_{\substack{k=0 \\ k \neq p}}^{1} (i - i_n - nk) \prod_{\substack{l=0 \\ l \neq q}}^{1} (j - j_n - nl) & (i_n \leq i < i_n + n) \text{ and } (j_n \leq j < j_n + n) \\ 0 & \text{otherwise} \end{cases} \quad (11)$$

The function blocks ($X_{ijpq}$) define a window within a local area (separated by dashed lines 351, 352, 353, 354, 355, 356, 357, 358, and 359) as shown in FIG. 3. With $N_T$ being three times the total number of knots, Eq. (8) can be written as $$\frac{\partial T_{i\,j}}{\partial t} = \sum_{\alpha=1}^{3N_L} a_\alpha B_{\alpha\,i\,j} = \sum_{\alpha=1}^{N_T} a_\alpha B_{\alpha\,i\,j}, \quad (12)$$

where the index α extends over all the sub-array corner pixels (knots) in the image.

As shown in FIG. 3, in some instances, the total number of pixels is not covered completely by the bilinear square grids. For example, if a cloud edge or land boundary falls in the interior of a sub-array, that sub-array is not used in the velocity inversion. This results in a number of pixels on the periphery of the image for which there is no derived velocity.

A chi function $\chi^2$ expresses the error in fitting a set of $a_\alpha$ to the data, and is defined by $$\chi^2 = \frac{1}{N_1 N_2} \sum_{i=1}^{N_1} \sum_{j=1}^{N_2} \left( \frac{\partial T_{i\,j}}{\partial t} - \sum_{\alpha=1}^{N_T} a_\alpha B_{\alpha\,ij} \right)^2 \quad (13)$$

where $N_1$ and $N_2$ are the total number of selected indices (i.e., where there exist actual data points as seen in FIG. 3) in the x and y directions, respectively.

A global optimal solution is obtained by minimizing $\chi^2$ with respect to the $a_\alpha$ and noting that $\partial(a_\alpha B_{\alpha\,i\,j})/\partial a_\beta = B_{\beta\,i\,j}$. This minimization procedure is a linear regression problem, which results in the following linear system of equations for the matrix $a(\equiv a_\alpha)$:

$$a = L^{-1} b \quad (14)$$

where $$L_{\alpha\,\beta} = \frac{1}{N_1 N_2} \sum_{i=1}^{N_1} \sum_{j=1}^{N_2} B_{\alpha\,ij} B_{\beta\,ij}, \quad (15)$$

$$b_\alpha = \frac{1}{N_1 N_2} \sum_{i=1}^{N_1} \sum_{j=1}^{N_2} B_{\alpha\,i\,j} \frac{\partial T_{i\,j}}{\partial t}, \quad (16)$$

L is a $N_T \times N_T$ matrix, and b is a $N_T$ dimensional vector. Since $N_T$ is dependent on the number of pixels for a particular image pair and the number of interpolation points, $N_T$ will normally be on the order of hundreds to thousands. An inversion of the heat equation thus becomes a global linear optimization problem, and a velocity field and pseudo-sources on knots can be obtained over the whole image by solving the linear system of equations for the matrix a (Equation 14).

Thus, at step 122 of FIG. 1B, the heat equation is solved at the independent points of each sub array (the knots or corner points) by a least squares principle, e.g., by applying linear regression to minimize the total error over all pixels. Thus, solve equation (13), with the $a_\alpha$ and $B_{\alpha ij}$ being components of the finite difference form of the heat equation as defined in equation (9) and (10).

At step 124 of FIG. 1B, it is noted that once the u, v, and s terms at the knot points have been found, the remaining pixels in each sub-array are defined by the Lagrangian bilinear interpolation equation.

A velocity field plot can be generated at step 126 of FIG. 1B, either alone or overlaid over an image of the surface. The velocity field plot has a number of arrows, with the length of the arrow indicating magnitude of surface velocity, and the direction of the arrow indicating the surface velocity direction. Depending on the number of pixels, it is suitable to plot the field with only a subset of the pixels plotted. For example, it might be suitable to plot only every $10^{th}$ pixel, depending on the size of the plot and the pixel resolution, as shown in later examples.

This method can also be used to solve an optical flow equation having a form similar to Equation (1), (7), or (8). In the optical flow equation, the source term can be set equal to zero, with the equation being solved for two unknown parameters u and v. Alternatively, the source s can be non-zero, with the equation being solved for the three unknowns u, v, and s, with the source term s representing light or illumination changes between different images, or another variable.

EXAMPLES

To assess the ability of the present method to obtain surface velocities, the solution of a numerical model can be used as a benchmark, with a surface tracer field as an initial condition. Next, invert the evolving tracer field for velocity, and compare these derived velocity fields directly with the known model velocity fields. This approach also allows the addition of a known amount of noise to the model tracer fields to determine how robust the GOS technique would be in yielding velocity fields from noisy image data. This solution is also used to compare the accuracy of the result to that of a velocity field from the MCC approach. For the model benchmark test, $S \approx 0$, and consider the inversion for u and v only; i.e., $\alpha=1, 2$.

A simulated flow field and its advection of sea surface temperature are obtained by solving the following 3D nonlinear fluid dynamical equations and the equation for the tracer (e.g., the temperature). The temperature T can treated simply as a passive tracer with a weak diffusivity added for numerical stability for the purpose of testing the model. The equations are $$\frac{\partial v}{\partial t} + v \cdot \nabla v + f \times v = -\nabla P - g + \nu \nabla^2 v \quad (17)$$

$$\nabla \cdot v = 0 \quad (18)$$

$$\frac{\partial T}{\partial t} + v_H \cdot \nabla_H T = \kappa \nabla_H^2 T, \quad (19)$$

where the velocity vector is v=(u, v, w) in the Cartesian coordinate system; the Coriolis frequency is $f=(0,0, 8.76 \times 10^{-5})$/s; the gravitational vector is g=(0,0, 9.8) m/s$^2$; P is the pressure divided by density (assumed constant), $\nu$ is the eddy viscosity, and $\kappa$ is the eddy diffusivity. The subscript, H, denotes the horizontal components of the velocity vector and $\nabla$ is the gradient vector. Use the solution procedure of Shen, C. Y., T. E. Evans, R. P. Mied, and S. R. Chubb, "A velocity projection framework for inferring shallow water currents from surface tracer fields", Cont. Shelf Res., Vol. 28, pp. 849-864, 2008, based on a pseudo-spectral calculation. The 3D domain of this model has a rigid flat surface at the top and bottom and open periodic boundary conditions on the four sides. The horizontal dimension of the model domain is L=50 km. The depth of the domain is 30 m, and the horizontal resolution (0.521 km) results from an evenly spaced grid with 96 points on each side. In the vertical direction, a 25-point cosine grid is used, which has a variable spacing from 0.128 m near the surface to 1.96 m at the mid-depth. The horizontal diffusivity of T is $1.904 \times 10^{-2}$ m$^2$/s. The horizontal eddy viscosity for velocity is $1.904 \times 10^{-2}$ m$^2$/s and the vertical is $5.96 \times 10^{-2}$ m$^2$/s.

The initial T field has the functional form T=T$_0$ sin(2πx/L) sin(2πy/L) prescribed at the top surface, and its motion is governed only by the surface components of the evolving 3D velocity field. Similarly, the initial velocity field is defined in terms of the first three Fourier components (i.e., 2π/L, 4π/L, and 6π/L), but each of these are uncorrelated in phase. This flow, governed by the above fluid dynamical equations, is allowed to evolve freely without forcing.

The inversion of the simulated SST for surface flow is performed using the global optimal solution method of FIG. 1-3 for a range of sub-array sizes, but with all the sub-arrays having a square shape. In terms of the number of grid points, the smallest array size tested has the dimension of n+1=9 points on each side (see FIG. 2), and the largest one has 25. Only the bilinear interpolation polynomial (Equation 4) is used in each array to connect the four corner-points or knots to the other points. For example, the bilinear interpolation polynomial connects the corner points 201, 202, 203, and 204 to the interior points 205-216 of the sub-array 301 in FIG. 3.

Figure 4C:
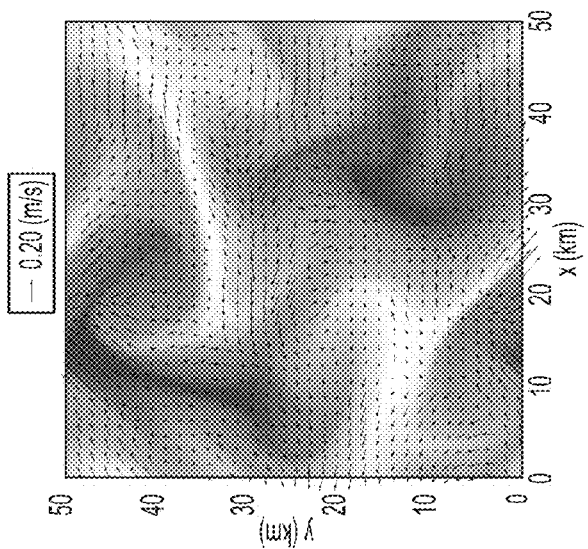
FIG. 4C shows the velocity field for the same portion of the ocean as estimated by the Maximum Cross Correlation (MCC) method.
Figure 4B:
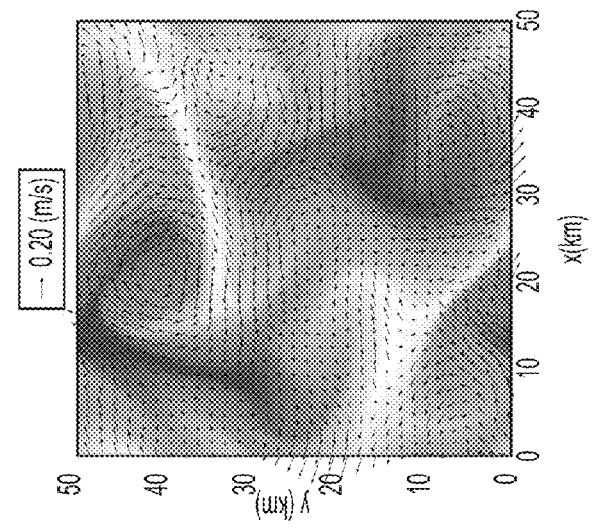
FIG. 4B shows the velocity field for the same portion of the ocean as estimated by the Global Optimal Solution method of FIG. 1A and FIG. 1B.
Figure 4A:
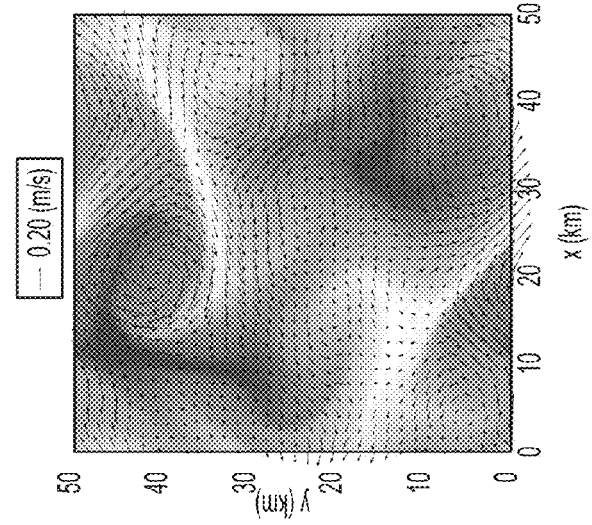
FIG. 4A shows the velocity field determined with an advection model of a portion of the ocean.

FIG. 4A shows the benchmark velocity vectors given by the numerical model, as the average of the actual fields generated at the model at times $t_1$=18 hours and $t_2$=18 hours. FIG. 4B shows the velocity vectors determined according to the global optimal solution (GOS) between times $t_1$=18 hours and $t_2$=18 hours as described above and shown in FIG. 1-3. FIG. 4C shows the velocity vectors determined according to the MCC method. Vectors are plotted at every third pixel. The sub-arrays used to obtain this GOS result are n=10 grid points wide on each side. This window size is also relevant to the fidelity of the MCC results. As described below, the windows for both the GOS and MCC have been optimized to obtain the results in FIGS. 4B and 4C. The gray-scale image in the background is the tracer field (or simulated SST), which by this time, has been deformed by the currents and is significantly different from its original sin(2π/L)sin(2πy/L) square cell shape.

The three velocity vector fields in FIG. 4A-4C each show a distribution of eddies having diameters of order 15 km and more gently curved tendril structures with larger radii of curvature. There are three prominent eddies in the modeled tracer field (FIG. 4A), with centers located at approximately (5 km, 5 km), (36 km, 5 km), and (21 km, 40 km). The GOS results (FIG. 4B) capture these features qualitatively well, and represent them as well-defined vortices. These eddies are also apparent in the MCC result of FIG. 4C as clearly discernable vorticity anomalies, but are not as circular and well defined as those in the FIG. 4B GOS image. The more gently curved filamentary structures, on the other hand, are faithfully captured by both the GOS and MCC techniques. Two examples of this are the jets of fluid exiting the left edge of the box at y≈25 km and the one at the upper right-hand corner.

Figure 5A:
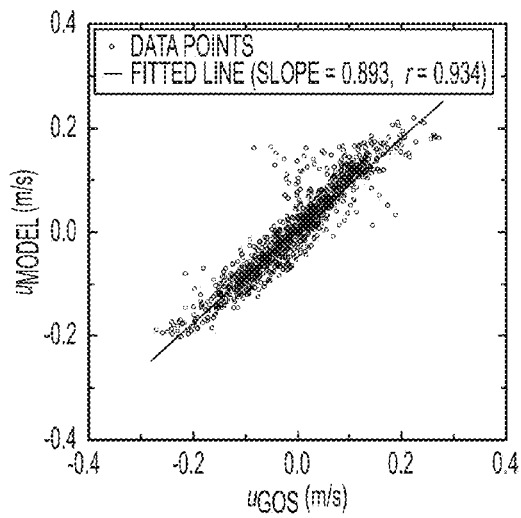
FIGS. 5A and 5B are scatter plots of the x component and the y component of velocities from the advection model versus the FIGS. 3A and 3B results of the Global Optimal Solution method.
Figure 5B:
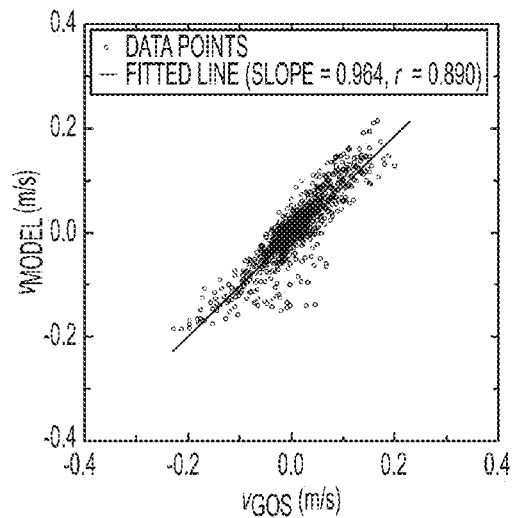

FIGS. 5A and 5B are scatter plots of model—versus the GOS velocities from FIGS. 3A and 3B, respectively. These scatter plots illustrate the capability of the GOS method to reproduce the model flow. Correlation coefficients of r=0.934 and 0.890 between the ($u_{MODEL}$, $u_{GOS}$) and ($v_{MODEL}$, $v_{GOS}$) pairs, respectively, indicate that both components of the model velocity are retrieved to high accuracy.

Another indicator of the velocity retrieval fidelity is the root mean square error (RMSE) between the GOS (or MCC) and modeled velocity fields. We define this to include a comparison between both velocity components:

$$RMSE = \sqrt{\frac{1}{2N_T}\left(\sum_{i=1}^{N_T}(u_i - \hat{u}_i)^2 + (v_i - \hat{v}_i)^2\right)}, \quad (20)$$

where $(u_i, v_i)$ come from either the GOS or MCC and $(\hat{u}_i, \hat{v}_i)$ are velocity components from the numerical model. The RMSE is a function of the number of interpolation points n. As the tracer evolves, however, we anticipate that another effect may come into play. The initial tracer distribution $(T=T_0 \sin(2\pi x/L)\sin(2\pi y/L))$ has only four closed cells in the L×L computational domain, while the pattern at 18 hours (FIG. 4A) shows a much more complicated pattern with narrow tracer filaments. A concern is that these tracer tendrils would require more interpolation points (n) to adequately represent them as they evolve and become narrower over time. Accordingly, we also locally filter the tracer field with a circularly symmetric low-pass Gaussian convolution filter over a $N_P \times N_P$ pixel square surrounding each pixel location. The standard deviation is $\sigma(N_p)=1.77 N_p$, where $N_p=9$ pixels.

Figure 6A:
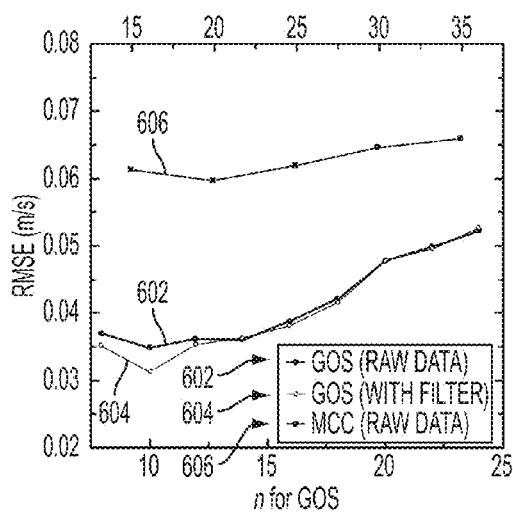
FIGS. 6A and 6B are plots of the root mean square error versus number of interpolation points n for the Global Optimal Solution method with raw data, the Global Optimal Solution method with filtered data, and the Maximum Cross Correlation method.
Figure 6B:
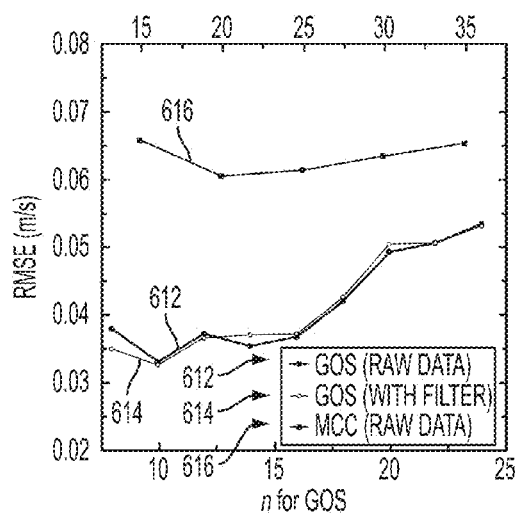
Figure 7A:
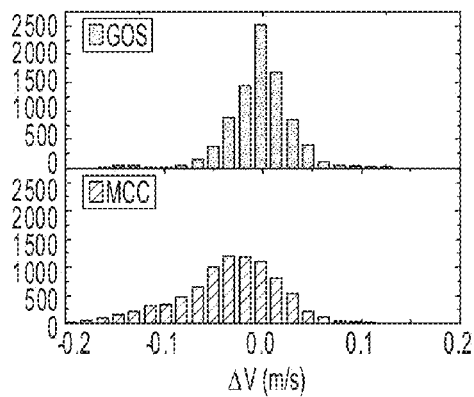
FIGS. 7A-7D are histograms of magnitude and angle differences between ocean model velocities and the velocities determined according to the Global Optimal Solution method and the Maximum Cross Correlation method.
Figure 7B:
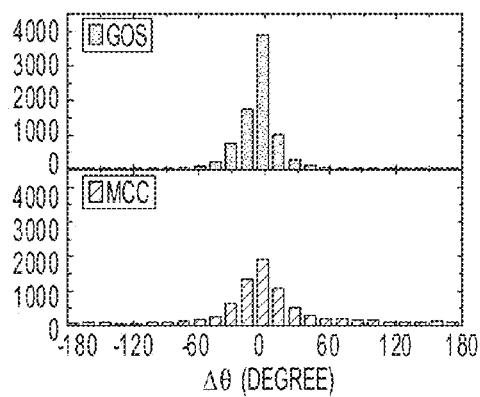
Figure 7C:
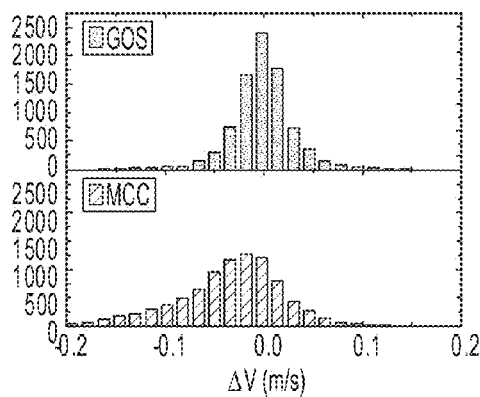
Figure 7D:
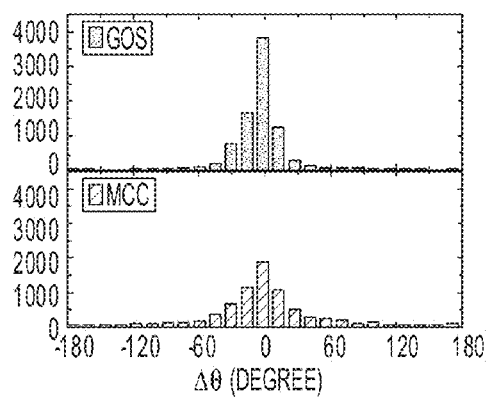

We investigate the sensitivity of this n dependence and the effect of the filter in FIGS. 6A and 6B, which show the actual values of RMSE are shown for a range of n and MCC template sizes for $\Delta t=2$ hr and $\Delta t=4$ hr, respectively.

The root mean square error (RMSE) that results from applying velocity inversions using GOS unfiltered and filtered methods, and from applying a Maximum Cross Correlation (MCC) technique described in Emery et al. "An Objective Method for Computing Advective Surface Velocities from Sequential Infrared Satellite Images", J. Geophys. Res., Vol. 91, pp. 12865-12878, 1986, at a time interval of 2 hours are shown in FIG. 6A as plotted data sets 602, 604, and 606, respectively. FIG. 6B shows the same plotted data sets 612, 614, and 616 for a time interval between images of four hours. Note that the results from the filtered and unfiltered GOS method have a lower RMSE than the MCC raw data results at both time intervals. It is also apparent that the GOS velocities derived using both filtered and unfiltered tracer distributions show little qualitative difference in RMSE.

These curves can also be used to optimize the appropriate values for the time interval $\Delta t$ and for n. By comparing the RMSE values for a particular value of n in FIG. 6A with the corresponding value in FIG. 6B, it is seen that there is only a small difference in RMSE levels for the two time intervals. In addition, the results shown in FIGS. 6A and 6B indicate that there is a GOS value of n that would produce the most accurate result.

The GOS curves of FIGS. 6A and 6B exhibit a local minimum in the vicinity of n≈10, and two competing phenomena—one at small n and another for large n—appear to be responsible for this. When n is small, the number of bilinear squares required to cover the image must be large, as seen in FIG. 3. When n is small, there are few n points over which to fit to the bilinear velocity expression to each square, so the system is not strongly over-determined. As n increases, however, the bilinear fits become more accurate and the RMSE decreases. An offsetting effect occurs for very large n. For very large n, the number of knots, and thus the number of pixel subsets used to tile the image, decreases markedly. Consequently, a potentially complex tracer distribution is described with far fewer bilinear expressions, and the accuracy can decrease. Therefore, larger values of n will reduce the ability to capture small-scale variability in the velocity field, which accounts for the increasing error for large n. The net effect of these two offsetting phenomena is the local minimum apparent in each GOS curve at about n≈10.

FIGS. 6A and 6B also displays information about MCC velocities derived from the model output. The MCC template size is varied at $t=t_1$. The larger window is formed at $t=t_2$ by surrounding this template on all sides with a border of width 15 pixels. At this later time $t=t_2$, the window is equal to MCC template size+2×15 pixels square. This is sufficiently large that features in the smaller template at $t_1$ require ~7.2 hr to be advected out of the fifteen-pixel border surrounding it, assuming a de-facto characteristic speed of 0.3 m/s. This is significantly longer than the interval between images of $\Delta t=t_2-t_1=2$ hr or 4 hr. With these window sizes, 90% of the correlation coefficients have values of 0.94 or greater, which provides confidence that the velocities can be accurately retrieved. A minimum RMSE occurs when the MCC template size at $t=t_1$ is approximately 20 pixels, as seen in FIGS. 6A and 6B.

The autocorrelation surface as a function of x and y for the tracer patterns in FIG. 4A-4D has been determined to be approximately circular. The width of this surface at half-amplitude is an autocorrelation length scale for the tracer distribution and the underlying velocity field responsible for its development. The autocorrelation width at one half the maximum autocorrelation amplitude is approximately 20 pixels, which is the point at which the MCC inversion in FIG. 6A-6B yields the smallest error.

FIG. 7A-7D are histograms of the errors in speed and direction for $\Delta t=2$ hr and 4 hr for the GOS method and the MCC method. To effect a valid comparison, the number of velocity realizations is the same for both techniques, and we note that significant differences exist between the GOS and MCC behaviors. Compared with the MCC vectors, the GOS velocities appear to better capture the numerical model velocities. In particular, the distributions of both $\Delta V$ and $\Delta \theta$ are narrower and have larger peaks than those for the MCC. In addition, the GOS difference distributions are more symmetric than those for the MCC, and the GOS histograms also tend to be more closely centered around $\Delta V=\Delta \theta=0$. We conclude that the GOS technique can produce a more accurate velocity field than the MCC approach for this numerical model simulation.

An important issue in applying the GOS method to actual Advanced Very High Resolution Radiometer (AVHRR) images is the ability of the technique to deal with image noise. In order to assess this quantitatively before applying the GOS technique to actual AVHRR images, white noise is added to the computed tracer by adding a random number $R_{i,j}$ in the range min $\{T_{ij}\} \leq R_{i,j} \leq$ max $\{T_{ij}\}$ to the tracer value $T_{i,j}$ at each point, so that the simulated noisy tracer field becomes $T_{i,j}+rR_{i,j}$, where r is 0.05 and 0.10.

Figure 8A:
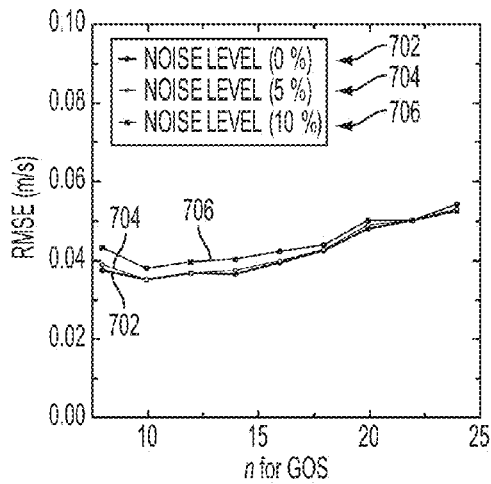
FIGS. 8A and 8B are plots of the root mean square error using the Global Optimal Solution method versus the number of interpolation points with added noise levels.
Figure 8B:
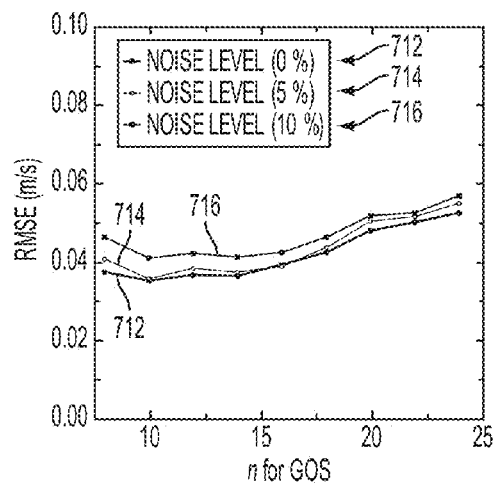

FIGS. 8A and 8B illustrate the effect of the added noise on the derived velocities at the time intervals $\Delta t$ of 2 and 4 hours, respectively. The plots show the RMSE values for a 5% noise level as plotted data set 704 in FIGS. 8A and 714 in FIG. 8B, for a 10% noise level as plotted data set 706 in FIGS. 8A and 716 in FIG. 8B, and for the original noise-free (r=0) model output as plotted data set 702 in FIGS. 8A and 712 in FIG. 8B, all using raw (unfiltered) numerical model tracer data. For both $\Delta t$ values, it is clear that the addition of noise increases the RMSE for almost all n, but the increase is not large. The unfiltered model tracer output yields RMSEs of about 0.04 for noise levels of 0-10% for 2 hour and 4 hour image separations when n is in the range of about 10 to about 15. The largest error increase occurs for $\Delta t=4$ hr when n is approximately 8. In this case, changing r from 0% to 10% increases the RMSE from approximately 0.038 to approximately 0.046.

Figure 9A:
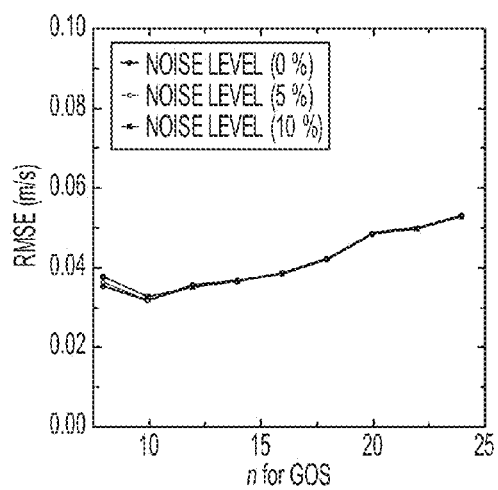
FIGS. 9A and 9B are plots of the root mean square error using the Global Optimal Solution method with a Gaussian convolution filter and added noise levels versus the number of interpolation points.
Figure 9B:
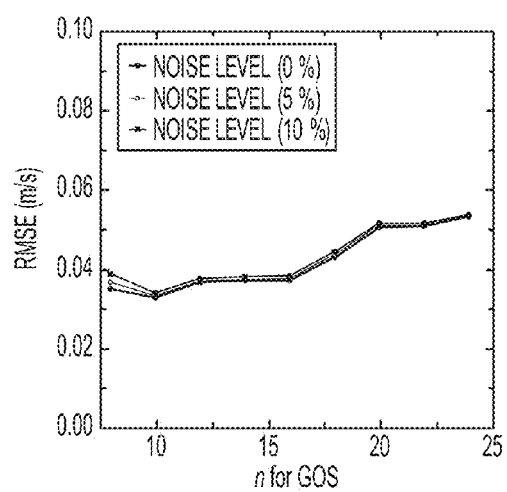

FIGS. 9A and 9B plot the RMSE for the same data as in FIGS. 8A and 8B, except the tracer has been spatially convolved with a low-pass Gaussian filter. Since the random noise introduces a pixel-to-pixel variation, the low-pass filter effectively removes these fluctuations, and the derived velocities exhibit a noticeably lower RMSE over a broader range of n. Thus, the low-pass filter almost nullifies the effect of adding pixel noise to the simulated image set.

In an exemplary embodiment, the GOS method of FIG. 1 and as described above can be used to obtain accurate estimates of the ocean surface velocity from AVHRR image sequences.

As one example, a velocity field is derived from five NOAA satellite images of the New York Bight, east of the New Jersey coast and south of Long Island, N.Y. taken on Feb. 28, 2004 at times $t_i$=11:13, 14:36, 16:15, 19:02, and 22:32 UT, respectively. Velocities are calculated each of the four image pairs at contiguous times. The pixel resolution for the images is 1.15 km in the north-south and east-west directions. The temporal separations between images are thus $\Delta t_i \equiv t_{i+1} - t_i$=3.383 h, 1.650 h, 2.783 h, and 3.500 h, respectively. Note that these time periods are not very different than the two hour and four hour time intervals considered above. We examine the results over the New York Bight for the pair with the largest temporal separation (3.5 h), and then compare the details of the flows and statistical results of all four velocity fields in the smaller region where corroborating shore-based Doppler radar coverage exists.

Figure 10:
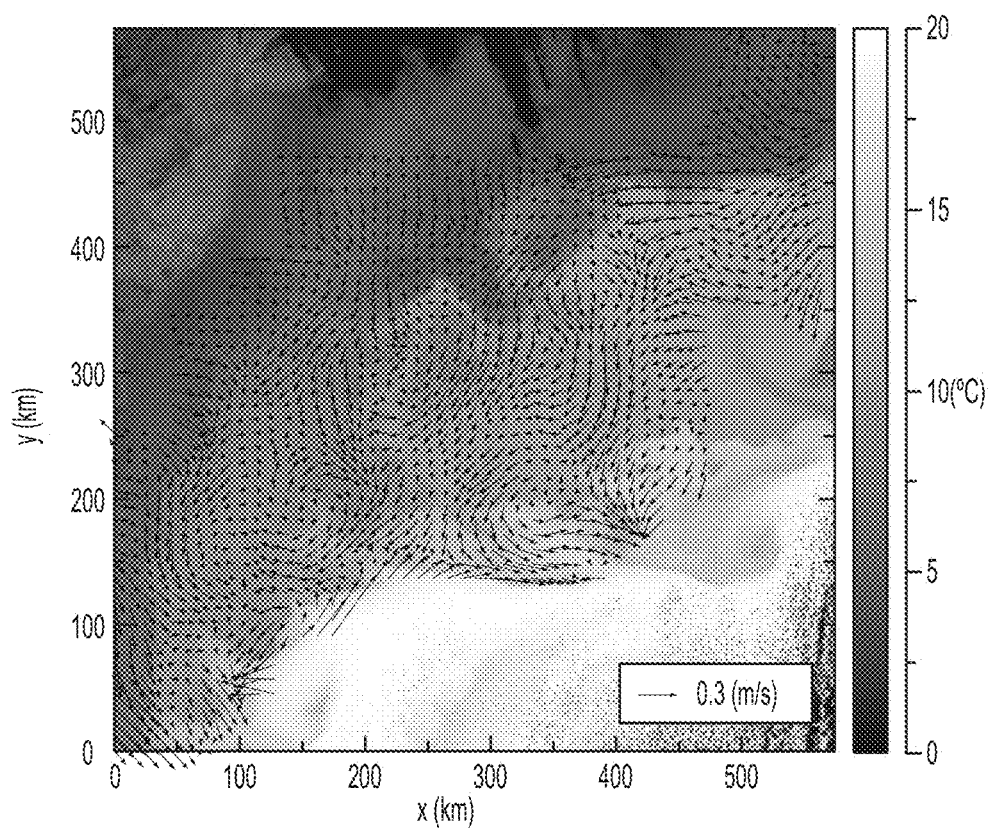
FIG. 10 illustrates velocity vector field derived from a thermal image sequence from the Advanced Very High Resolution Radiometer (AVHRR).

FIG. 10 illustrates the vector field derived by applying the GOS method to the AVHRR sequence taken at 19:02 and 22:32 UT on Feb. 28, 2004, superimposed on the AVHRR image taken at 22:32 UT. Vectors are plotted every tenth pixel, and the image is the second one in the pair. The northern portion of the image shows some atmospheric water haze contamination in the dark streaks extending from the northern edge of the image down in a south-southeasterly direction. Their presence is also verified from the negative values delivered there by the NOAA Sea Surface Temperature (SST) algorithm. Additional cloud contamination is also clearly present in the southeastern part of the image as spotted streaks extending northward in the vicinity of the Gulf Stream. The earlier image (at 19:02 UT, and not shown here) shows far more extensive cloud coverage over the Gulf Stream. In order to apply the GOS technique, the clouds and land are masked. An expanded view of the resulting masked image will have the form of FIG. 3, with right-angle cutouts around the edge at the discarded square bilinear grids containing clouds (in the north and south) or land (toward the west).

While evidence of organized flows is clearly evident, it is also possible to make a detailed comparison between the derived GOS and MCC velocity fields and a "ground truth" realization of the same velocity field obtained from the Rutgers University Coastal Ocean Dynamics Radar (CODAR).

This CODAR array has a resolution of 6 km, and velocity magnitude and direction accuracies of ±0.04 cm/s and ±1°, respectively, according to Kohut et al., 2004.

FIGS. 11A-11C, 12A-12C, 13A-13C, and 14A-14C illustrate the CODAR and corresponding local GOS and MCC velocity fields for all four time intervals (11:13 to 14:36 UT on 28 Feb. 2004; 14:36 to 16:15 UT on 28 Feb. 2004; 16:15 to 19:02 UT on 28 Feb. 2004; and 19:02 to 22:32 UT on 28 Feb. 2004). The CODAR fields shown in these Figures have already been used in a comparison between velocities derived from an inversion of the heat equation and MCC (Chubb et al., 2008) and to validate the velocities from a Velocity Projection computation (Shen et al., 2008). The radar fields at the mid point of the image time interval [e.g., (11:13 UT, 14:36 UT) in FIGS. 11A-11C] have been derived from interpolating the Rutgers hourly records (Chubb et al., 2008).

In each of the CODAR, GOS, and MCC velocity vector plots, a flow from the north toward the south is apparent for all four time intervals. The northern half of the CODAR footprint shows an anticlockwise eddy with diameter of approximately 50 km and centered around (200 km, 425 km), which is present in FIGS. 11A, 12A, and 13A, but is not apparent in FIG. 14A. As time progresses from the first time interval, an eddy field develops on the western side of the footprint and these structures evolve to a more complicated field of vorticity.

A quantitative comparison can be made between the GOS and MCC predictions and CODAR velocities by comparing their magnitudes and directions, by using the complex correlation coefficient ρ, which is defined as $$\rho = \frac{\langle \omega \cdot \omega *_{CODAR} \rangle}{[\langle \omega \cdot \omega * \rangle \langle \omega_{CODAR} \cdot \omega *_{CODAR} \rangle]^{1/2}} \equiv |\rho| e^{i\phi}, \quad (21)$$

where ω represents the surface velocity field (u,v) (for either the GOS or MCC result) as a complex number defined by $$\omega = u + i \cdot v,$$

$$\omega^* = u - i \cdot v, \quad (22)$$

with $\omega_{CODAR}$ defined similarly for the CODAR velocity. The correlation coefficient magnitude |ρ| is thus $$|\rho| = [(Re(\rho))^2 + (Im(\rho))^2]^{1/2} \quad (23)$$

and an average angular phase difference between the derived (GOS or MCC) velocity field and the CODAR ones. We define the phase by $$\phi = \tan^{-1}[Im(\rho)/Re(\rho)]. \quad (24)$$

The phase of ρ indicates that φ is as an average angular difference between the derived and CODAR velocities. Anticlockwise angles are positive, so φ>0 represents a scenario in which derived velocities are oriented anticlockwise with respect to the CODAR vectors.

The results of calculating the correlation coefficient magnitude and phase angle are summarized in Table 1 for both the GOS and MCC velocity fields for the four time intervals, as well as the RMSE calculated according to Equation (20).

TABLE 1

| Time | GOS RMSE | MCC RMSE | φ (GOS) | φ (MCC) | ρ (GOS) | ρ (MCC) |
|---|---|---|---|---|---|---|
| 11:13-14:36 | 0.0934 | 0.1180 | −11.6 | −9.38 | 0.845 | 0.806 |
| 14:36-16:15 | 0.0986 | 0.1060 | −33.9 | −25.3 | 0.747 | 0.593 |
| 16:15-19:02 | 0.0745 | 0.0989 | 8.83 | 7.02 | 0.719 | 0.541 |
| 19:02-22:32 | 0.0716 | 0.0767 | −13.7 | −13.2 | 0.738 | 0.711 |
| Average | 0.0845 | 0.0999 | −12.60 | −10.2 | 0.762 | 0.663 |

Table 1 illustrates several trends. The GOS error values are smaller than those for the MCC for each of the time intervals. For the last time interval (19:02-22:32 UT), the GOS and MCC values are quite close, while they differ greatest for the first time interval (11:13-14:36 UT). Nevertheless, the GOS velocities are more accurate (have smaller RMSE) than the MCC velocity results for each time interval.

In Table 1 also lists the correlation magnitude and its phase. For each of the four times, the phase agreement between the MCC and CODAR is slightly better than that between the GOS and CODAR (by an average of 2.4°); that is, |φ(MCC)|<|φ(GOS)|. For the magnitude of the complex correlation, the opposite is true. The correlation magnitude for the GOS exceeds that of the MCC for all time increments, or |ρ(GOS)|>|ρ(MCC)| by an average of 0.762 vs. 0.663.

The method described above is a Global Optimal Solution (GOS) inverse technique suitable to obtain near-surface velocity from sequential infrared images. Two-dimensional bilinear Lagrange interpolation over a small pixel array is used to convert the inverse problem from a locally under-determined system of equations to an over-determined one without using divergence and vorticity constraints. The bilinear interpolation is then extended over the ensemble of the remaining array subsets to form a representation of the entire image area. At those locations where the land or clouds occupy a portion of a bilinear array, that array is discarded (as shown in FIG. 3) and a "mask" is generated. It is natural to ask whether formation of the masked data set can be automated, so that hundreds or even thousands of images can be processed with minimal human intervention. We have not attempted to automate the algorithm, but our limited experience with the land and cloud masks in this work allows us some insight into the potential for this. Delineating the land/ocean boundary automatically is the same as would be used in an MCC calculation. Similarly, masking a cloud is equivalent to the land-edge problem. The presence of a cluster of small clouds presents the greatest challenge to automation, because it requires programming logic to account for the cloud size, and the proximity to its neighbor in order to decide whether to exclude the entire cloudy region or to simply exclude individual clouds. Therefore, automating the land/ocean and cloud mask algorithms is likely to be possible, though not necessarily simple. A related issue regarding the advisability of automating the algorithm is the time required to compute a GOS solution as opposed to an MCC one. For the model derived velocities in FIGS. 4B and 4C, the times required on a PC with 3.0 GHz Intel Xeon CPU are about 0.98 s for GOS and 7.9 s for MCC.

The resulting GOS velocity fields have also been compared with those from the numerical model and from the MCC technique. A histogram of the difference between GOS and numerical model velocities is narrower and more peaked than that with the MCC/model comparison. Calculation of the root mean square error difference between the GOS (and MCC) results and the model velocities indicates that the GOS/model error is only half that of the MCC/model error. With actual AVHRR data however, the difference between the two techniques is smaller, but significant in correlation magnitude, as seen in Table 1.

The number of interpolation points between neighboring knot points can be optimized. For a small number of interpolation points n between neighboring knot points, the system is not well determined and the RMSE is large. As the number of interpolation points becomes large, the number of knots, and hence the number of pixel subsets used to tile the image, decreases, with a concomitant increase in RMSE. An optimum intermediate value of n thus exists for which the RMSE is a minimum. The optimal interpolation points n must be larger than V·Δt to optimize the number of interpolation points. However, the dependence between the polynomial approximation of the velocity and accuracy of the tracer advection appears to be subtle. At this time, it is clear that improvement is possible using this global approach within a range of interpolation points n. Moreover, it appears that increasing the time interval from Δt=2 hours to 4 hours has only a small effect upon the accuracy of velocity vector retrieval.

A concern in deriving a velocity field from an image pair is the impact pixel noise has upon the accuracy of the result. In order to investigate the effect of this, the model-generated tracer fields have been contaminated with known amounts of white noise. It is noted that when as much as 10% white noise is added to the images, convolving the contaminated images with a Gaussian filter effectively nullifies the effect of the simulated pixel noise.

This approach can provide an accurate technique to estimate sea surface velocities from satellite SST fields. When optimized for the number of knot points, the technique is capable of producing velocities that may exceed those derived with the MCC technique. And indeed, application of GOS and MCC to four pairs of NOAA AVHRR images shows that when compared with CODAR, the RMSE is a little lower for the GOS results than it is for the MCC velocities. Additionally, the complex correlation magnitude between GOS and CODAR is greater than the one between MCC and CODAR. However, the MCC and CODAR results appear to agree in angle more than do those of the GOS and CODAR.

Embodiments of the invention also are directed a computer software application configured as programmed instructions for implementing the hyperspectral image data compression method described herein, and to non-transitory computer readable media storing computer readable instructions thereon for implementing the method. The system can be implemented in Microsoft Visual C++, and operated on a Microsoft Windows computer operating system, although other programming languages and operating systems are also suitable.

The computer-based system can also include storage capabilities. All the acquired data, including original and compressed hyperspectral data cubes, individual images, can be stored locally in addition to being transmitted over a communications link.

In an exemplary embodiment, the system can operate without human control for compression and transmission of the compressed data, or can receive instructions via a communication link and user interface.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, C, C++, Java, Python and Perl.

By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices.

Although this invention has been described in relation to several exemplary embodiments thereof, it is well understood by those skilled in the art that other variations and modifications can be affected on the preferred embodiments without departing from scope and spirit of the invention as set forth in the following claims.

What is claimed as new and desired to be protected by Letters Patent of the United States is:

1. A computer based method for estimating surface velocity based on a time series of at least two images of a same portion of the ocean surface, with a heat equation having unknown parameters being a heat source term, an x-component of the surface velocity, and a y-component of the surface velocity, the method comprising:
    assigning a pattern of sub-arrays with a number of pixels in each sub-array, the number of pixels in each sub-array being at least as large as the product of the number of unknown parameters in the heat equation times the number of corner pixels in each sub-array;
    wherein for each sub-array, the unknown parameters for each interior pixel are defined using bilinear interpolation based on the adjacent corner pixels; and
    using linear regression to solve for the unknown parameters u, v, and s for each corner pixel by minimizing total error of the heat equation in finite difference form at all pixels, wherein u is the x-component of the surface velocity, v is the y-component of the surface velocity, and s is the heat source term.

2. The method according to claim 1, further comprising:
    solving for the unknown parameters of the remaining pixels with bilinear interpolation based on the values of the unknown parameters at the corner pixels.

3. The method according to claim 1, wherein said images are infrared or thermal images from a satellite sensor.

4. The method according to claim 1, wherein said images are in the visible wavelength band.

5. The method according to claim 1, wherein said images are from the Advanced Very High Resolution Radiometer.

6. The method according to claim 1, wherein said sub-array is square.

7. The method according to claim 1, wherein said solving the heat equation is accomplished without using divergence and vorticity constraints.

8. The method according to claim 1, further comprising:
    outputting a velocity field plot with arrows at a subset of pixels representing the magnitude and direction of the velocity at the subset of image pixels.

9. The method according to claim 1, further comprising:
    receiving the time series of images from the sensor.

10. The method according to claim 1, further comprising:
    excluding sub-arrays in which clouds obscure the surface and sub-arrays which include land.

11. The method according to claim 1, wherein the number of unknown parameters is three and the number of pixels in each sub-array is at least twelve.

12. The method according to claim 1, wherein the number of unknown parameters is two and the number of pixels in each sub-array is at least eight.

13. A computer based method for estimating velocity based on a time series of at least two images of a same portion of the ocean surface, with an optical flow equation having unknown parameters including an x-component of the surface velocity and a y-component of the surface velocity, the method comprising:
    assigning a pattern of sub-arrays with a number of pixels in each sub-array, the number of pixels in each sub-array being at least as large as the product of the number of unknown parameters in the heat equation times the number of corner pixels in each sub-array;
    wherein for each sub-array, the unknown parameters for each interior pixel are defined using bilinear interpolation based on the adjacent corner pixels;
    using linear regression to solve for the unknown parameters u and v for each corner pixel by minimizing total error of the heat equation in finite difference form at all pixels, wherein u is the x-component of the surface velocity and v is the y-component of the surface velocity.

14. The method according to claim 1, wherein using linear regression includes minimizing the total error according to $$\chi^2 = \frac{1}{N_1 N_2} \sum_{i=1}^{N_1} \sum_{j=1}^{N_2} \left( \frac{\partial T_{i,j}}{\partial t} - \sum_{\alpha=1}^{N_T} a_\alpha B_{\alpha\,ij} \right)^2, \text{ wherein}$$

$$B_{\alpha\,i\,j} = \begin{cases} X_{i\,j\,p\,q} & (1 \le \alpha \le N_L) \\ -\frac{\partial T_{i,j}}{\partial x} X_{i\,j\,p\,q} & (N_L + 1 \le \alpha \le 2N_L) \\ -\frac{\partial T_{i,j}}{\partial y} X_{i\,j\,p\,q} & (2N_L + 1 \le \alpha \le 3N_L) \end{cases},$$

$$\frac{\partial T_{i,j}}{\partial t} = \sum_{\alpha=1}^{3N_L} a_\alpha B_{\alpha\,i\,j} = \sum_{\alpha=1}^{N_T} a_\alpha B_{\alpha\,i\,j}, \text{ and}$$

$$a_\alpha = \begin{cases} s_\alpha & (1 \le \alpha \le N_L) \\ u_\alpha - N_L & (N_L + 1 \le \alpha \le 2N_L) \\ v_\alpha - 2N_L & (2N_L + 1 \le \alpha \le 3N_L) \end{cases}$$

wherein $\chi^2$ is an error in fitting unknown variables $a_\alpha$ and $B_\alpha$ to known data, $N_1$ is the total number of indices in the x direction at which data exists, $N_2$ is the total number of indices in the y direction at which data exists, $\alpha$ is a sequential vector index of the corner points in an image, $u_\alpha$ is the x-component of the surface velocity $\alpha$, $v_\alpha$ is the y-component of the surface velocity at $\alpha$, the unknown variables $a_\alpha$ and $B_\alpha$ are components of a finite difference form of the heat equation at $\alpha$, and $N_1$, is a number of corner points in an image for a given degree of an interpolation formula.

15. A non-transitory computer readable medium including programmed instructions stored thereon, said instructions configured for estimating surface velocity based on a time series of at least two images of a same portion of the ocean surface, with a heat equation having unknown parameters being a heat source term, an x-component of the surface velocity, and a y-component of the surface velocity, said instructions comprising:
    instructions for assigning a pattern of sub-arrays with a number of pixels in each sub-array,
    the number of pixels in each sub-array being at least as large as the product of the number of unknown parameters in the heat equation times the number of corner pixels in each sub-array;
    wherein for each sub-array, the unknown parameters for each interior pixel are defined using bilinear interpolation based on the adjacent corner pixels; and instructions for using linear regression to solve for the unknown parameters u, v, and s for each corner pixel by minimizing total error of the heat equation in finite difference form at all pixels, wherein u is the x-component of the surface velocity, v is the y-component of the surface velocity, and s is the heat source term.

16. The computer readable medium according to claim 15, further comprising:
instructions for solving for the unknown parameters of the remaining pixels with bilinear interpolation based on the values of the unknown parameters at the corner pixels.

17. The computer readable medium according to claim 15, wherein said images are infrared or thermal images from a satellite sensor.

18. The computer readable medium according to claim 15, wherein said images are in the visible wavelength band.

19. The computer readable medium according to claim 15, wherein said images are from the Advanced Very High Resolution Radiometer.

20. The computer readable medium according to claim 15, wherein said sub-array is square.

21. The computer readable medium according to claim 15, wherein said solving the heat equation is accomplished without using divergence and vorticity constraints.

22. The computer readable medium according to claim 15, further comprising:
instructions for outputting a velocity field plot with arrows at a subset of pixels representing the magnitude and direction of the velocity at the subset of image pixels.

23. The computer readable medium according to claim 15, in combination with an input mechanism adapted to receive the time series of images from a sensor.

24. The computer readable medium according to claim 15, further comprising:
instructions for excluding sub-arrays in which clouds obscure the surface and sub-arrays which include land.

25. The computer readable medium according to claim 15, wherein the number of unknown parameters is three and the number of pixels in each sub-array is at least twelve.

26. The computer readable medium according to claim 15, wherein the number of unknown parameters is two and the number of pixels in each sub-array is at least eight.

27. A computer based method for estimating velocity based on a time series of at least two images of a same portion of the ocean surface, with an optical flow equation having unknown parameters including an x-component of the surface velocity and a y-component of the surface velocity, the method comprising:

assigning a pattern of sub-arrays with a number of pixels in each sub-array, the number of pixels in each sub-array being at least as large as the product of the number of unknown parameters in the heat equation times the number of corner pixels in each sub-array;

wherein for each sub-array, the unknown parameters for each interior pixel are defined using bilinear interpolation based on the adjacent corner pixels;

using linear regression to solve for the unknown parameters u and v for each corner pixel by minimizing total error of the heat equation in finite difference form at all pixels, wherein u is the x-component of the surface velocity and v is the y-component of the surface velocity.

28. The computer readable medium according to claim 15, wherein said using linear regression includes minimizing the total error according to $$\chi^2 = \frac{1}{N_1 N_2} \sum_{i=1}^{N_1} \sum_{j=1}^{N_2} \left( \frac{\partial T_{i\,j}}{\partial t} - \sum_{\alpha=1}^{N_T} a_\alpha B_{\alpha\,ij} \right)^2, \text{ wherein}$$

$$B_{\alpha\,i\,j} = \begin{cases} X_{i\,j\,p\,q} & (1 \leq \alpha \leq N_L) \\ -\frac{\partial T_{i\,j}}{\partial x} X_{i\,j\,p\,q} & (N_L + 1 \leq \alpha \leq 2N_L) \\ -\frac{\partial T_{i\,j}}{\partial y} X_{i\,j\,p\,q} & (2N_L + 1 \leq \alpha \leq 3N_L) \end{cases},$$

$$\frac{\partial T_{i\,j}}{\partial t} = \sum_{\alpha=1}^{3N_L} a_\alpha B_{\alpha\,i\,j} = \sum_{\alpha=1}^{N_T} a_\alpha B_{\alpha\,i\,j}, \text{ and}$$

$$a_\alpha = \begin{cases} s_\alpha & (1 \leq \alpha \leq N_L) \\ u_{\alpha - N_L} & (N_L + 1 \leq \alpha \leq 2N_L) \\ v_{\alpha - 2N_L} & (2N_L + 1 \leq \alpha \leq 3N_L) \end{cases}$$

wherein $\chi^2$ is an error in fitting unknown variables $a_\alpha$ and $B_\alpha$ to known data, $N_1$ is the total number of selected indices in the x direction at which data exists, $N_2$ is the total number of selected indices in the y direction at which data exists, $\alpha$ is a sequential vector index of the corner points in an image, $u_\alpha$ is the x-component of the surface velocity at $\alpha$, $v_\alpha$ is the y-component of the surface velocity at $\alpha$, the unknown variables $a_\alpha$ and $B_\alpha$ are components of a finite difference form of the heat equation at $\alpha$, and $N_1$, is a number of corner points in an image for a given degree of an interpolation formula.

* * * * *